United States Patent
Wartell et al.

(10) Patent No.: US 7,711,949 B2
(45) Date of Patent: May 4, 2010

(54) APPARATUS AND METHOD FOR FRUSTRATING UNWANTED ACCESS TO DATA WITH A HOST DEVICE

(75) Inventors: Warren A. Wartell, Dallas, TX (US); Garry R. Elder, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 11/565,577

(22) Filed: Nov. 30, 2006

(65) Prior Publication Data

US 2008/0133941 A1 Jun. 5, 2008

(51) Int. Cl.
*G04L 12/56* (2006.01)

(52) U.S. Cl. .................. 713/154; 713/1; 713/2; 713/150; 713/168

(58) Field of Classification Search .......... 713/1, 713/2, 100, 150, 154, 168
See application file for complete search history.

(56) References Cited

U.S. PATENT DOCUMENTS

| | | | | |
|---|---|---|---|---|
| 5,581,559 A | * | 12/1996 | Crayford et al. | 370/392 |
| 5,640,393 A | * | 6/1997 | Lo et al. | 370/392 |
| 5,798,706 A | * | 8/1998 | Kraemer et al. | 726/3 |
| 5,838,793 A | * | 11/1998 | Lewis | 340/5.65 |
| 5,982,894 A | * | 11/1999 | McCalley et al. | 340/5.21 |
| 6,032,257 A | * | 2/2000 | Olarig et al. | 726/35 |
| 6,487,646 B1 | * | 11/2002 | Adams et al. | 711/163 |
| 6,490,667 B1 | * | 12/2002 | Ikeda | 711/163 |
| 7,512,992 B2 | * | 3/2009 | Komatsu | 726/34 |
| 2005/0181730 A1 | * | 8/2005 | Yamada et al. | 455/62 |
| 2006/0133612 A1 | * | 6/2006 | Abedi et al. | 380/270 |
| 2007/0132554 A1 | * | 6/2007 | Anderson | 340/5.72 |

* cited by examiner

*Primary Examiner*—Abdelmoniem Elamin
(74) *Attorney, Agent, or Firm*—William B. Kempler; Wade J. Brady, III; Frederick J. Telecky, Jr.

(57) ABSTRACT

An apparatus for frustrating unwanted access to data stored with a host device includes: (a) A data disrupting unit coupled with the host device for disrupting the data in response to an action signal. (b) At least one power source unit coupled with the host device. (c) A sensor unit coupled with the host device and with the at least one power source unit. The sensor unit is configured and coupled for sensing at least one alert condition associated with the host device. The sensor unit generates an alerting signal when at least one respective alert condition of the at least on alert condition is sensed. At least one respective power source unit of the at least one power source unit responds to the alerting signal to present the action signal to the data disrupting unit.

20 Claims, 2 Drawing Sheets

APPARATUS AND METHOD FOR FRUSTRATING UNWANTED ACCESS TO DATA WITH A HOST DEVICE

BACKGROUND OF THE INVENTION

The present invention is directed to security apparatuses and methods for electrical devices, and especially to security apparatuses and methods for microprocessors, non-volatile memory devices and similar electronic devices storing data. It is desirable to frustrate or deny unwanted access is to data stored in electronic devices.

By way of example and not by way of limitation, a security algorithm is sometimes used to safeguard data in a programmable non-volatile memory device. The security algorithm employs a security key for limiting access of those seeking access to data stored in the non-volatile memory device. Such limiting of access to information is an age-old challenge.

Recently manufacturers of some host devices have taken design steps to assure users of their devices are restricted to using the manufacturer's accessories. Host devices being so designed include, by way of example and not by way of limitation, portable computing devices, PDA (Portable Digital Assistant) devices, mobile phones and similar devices that use accessories. Accessories include by way of further example and not by way of limitation, batteries, automobile charging cords and similar accessory devices. Profits from sales of accessories sometimes have greater profit margins than do profits from sales of the base devices themselves. By way of example and not by way of limitation, manufacturers of lap top computing devices have installed firmware or software using a programmable memory such as a programmable flash memory configured to accept only certain accessory devices for operation. In devices so equipped, a user may find that an after-market battery manufactured by an entity other than the manufacturer of a portable computing device will not operate with the portable computing device. This design result is sometimes effected using a security algorithm in firmware. The security algorithm usually employs a security key, or keys, stored separately from the algorithm. The security key is a data set of digital information that must be known to the accessory sought to be installed. If the accessory successfully communicates in a predetermined manner with the host device into which it installed, then the host device will accept the accessory and operate properly with the accessory. Sometimes the functionality of the accessory is not completely negated by a failure to properly communicate with the security algorithm. By way of example and not by way of limitation, an automobile charging cord for operating a host device using a car's battery will also charge the host device's battery when fully functional. If the automobile charging cord does not properly communicate with the security algorithm in the host device, only operation using the car's battery may be permitted without permitting charging of the host device's battery from the car's battery.

Users may be expected to attempt to circumvent such security provisions in order to be able to freely use any accessory they wish to use. By way of example and not by way of limitation, if a user can learn the security key used with the security algorithm employed by the host device, the user can "fool" the host device into accepting a non-approved after market accessory not manufactured by the manufacturer of the host device or approved supplier. If access to the security data could be prevented a user could not circumvent the security provisions in place in the host device. Alternately one may frustrate access to security data, ensuring that the security data is altered or otherwise rendered unusable when an attempt is made to accomplish such unwanted access.

There is a need for an apparatus and method for frustrating or otherwise preventing unwanted access to data stored with a host device.

SUMMARY OF THE INVENTION

An apparatus for frustrating unwanted access to data stored with a host device includes: (a) A data disrupting unit coupled with the host device for disrupting the data in response to an action signal. (b) At least one power source unit coupled with the host device. (c) A sensor unit coupled with the host device and with the at least one power source unit. The sensor unit is configured and coupled for sensing at least one alert condition associated with the host device. The sensor unit generates an alerting signal when at least one respective alert condition of the at least on alert condition is sensed. At least one respective power source unit of the at least one power source unit responds to the alerting signal to present the action signal to the data disrupting unit.

A method for altering data stored in a host device when unwanted access to the data is attempted includes the steps of: (a) In no particular order: (1) providing a sensing unit coupled with the host device; (2) providing a data altering unit coupled with the host device; and (3) providing a power source coupled with the data altering unit and coupled with the sensing unit. (b) Operating the sensing unit to sense at least one predetermined alert-indicating condition indicating an attempt at achieving the unwanted access. (c) Operating the power source and the sensing unit cooperatively to provide power to the data altering unit when the sensing unit senses at least one alert-indicating condition of the at least one predetermined alert-indicating condition. (d) Operating the data altering unit to effect the altering so long as at least an operating-level power is provided to the data altering unit.

It is, therefore, an object of the present invention to provide an apparatus and method for frustrating or otherwise preventing unwanted access to data stored with a host device.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

Figure 1:
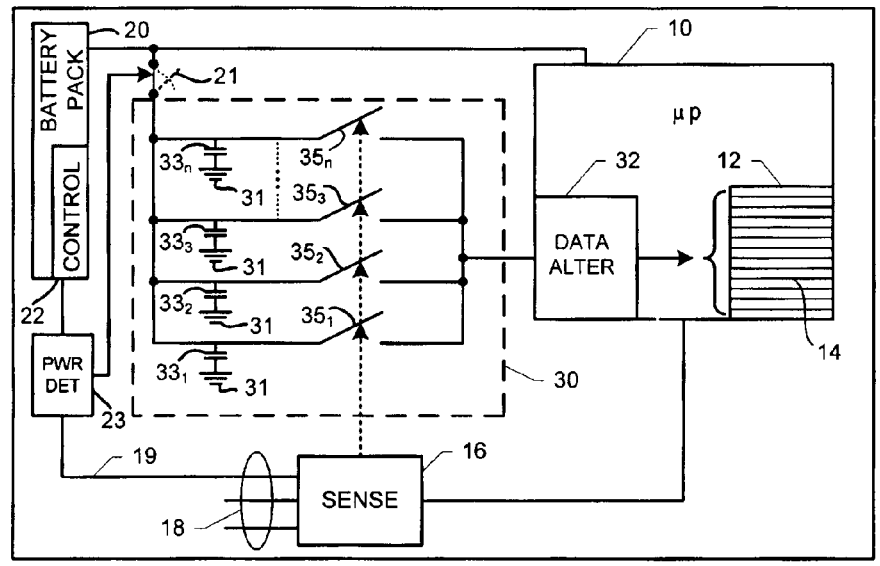
FIG. 1 is a simplified schematic diagram of the apparatus of the present invention.

FIG. 1 is a simplified schematic diagram of the apparatus of the present invention. In FIG. 1, a host device 10 includes a data store 12. By way of example and not by way of limitation, host device 10 may be embodied in a microprocessor unit. Data is stored in data store 12 as a plurality of data bits 14. A battery pack 20 is coupled with host device 10 for powering host device 10. Battery pack 20 includes a control unit 22 for effecting cooperation between battery pack 20 and host device 10. Control unit 22 may contain a "gas gauge" program for gauging amount of charge remaining in battery pack 20, or control unit may contain other control algorithms for effecting other safety or operational control functions such as avoiding completely discharging battery pack 20. A sensor unit 16 is coupled with host device 10 for sensing at least one alert condition associates with host device 10. Sensor unit 16 may be configured for sensing a plurality of alert conditions, as indicated by additional sensing lines 18. One sensing line 19 of additional sensing lines 18 may be coupled with a power detecting device 23. Other sense lines 18 may also be coupled for sensing alert conditions associated with battery pack 20, control unit 22 or both of battery pack 20 and control unit 22.

Alert conditions are conditions alerting one of an attempt at circumventing security measures or otherwise tampering with security devices installed in host device 10 or in an accessory or other device associated with host device 10 (e.g., battery pack 20). By way of example and not by way of limitation, alert conditions may include detection of removal of a control circuit board from control unit 22, detection of removal of a part from a control board in control unit 22, application of a test probe or application of a test signal to selected portions of battery pack 20 or control unit 22, improper removal of power from host device 10 or other tampering-indicating occurrences. Alert conditions may be detected by sensing states of particular pins within host device 10 or accessories connecting with host device 10. One may detect state changes at pins, reduced or "brown" power levels or other conditions at particular pins as indicators of alert conditions.

A power source unit 30 is coupled with host device 10 and with battery pack 20. In particular power source unit 30 is coupled with a data disrupting or altering unit 32 in host device 10. Data altering unit 32 is coupled with data store 12. Power source unit 30 includes a plurality of power sources $33_1, 33_2, 33_3, 33_n$, representatively embodied in capacitors in FIG. 1. Power sources $33_1, 33_2, 33_3, 33_n$ are coupled between battery pack 20 and ground loci 31. Power sources $33_1, 33_2, 33_3, 33_n$ are coupled with host device 10 via respective switches $35_1, 35_2, 35_3, 35_n$. The indicator "n" is employed to signify that there can be any number of power sources and associated switches coupled with host device 10. The inclusion of four power sources and associated switches in FIG. 1 is illustrative only and does not constitute any limitation regarding the number of power sources and associated switches that may be coupled with a host device in the present invention.

Sensor unit 16 provides a switching control signal for closing some or all of switches $35_1, 35_2, 35_3, 35_n$ when an alert condition or a particular combination of alert conditions is sensed by sensor unit 16. Closing a respective switch $35_n$ couples a respective power source $33_n$ with host device 10. This permits provision of power to data altering unit 32 sufficient to disturb, alter, change or otherwise affect data stored in data store 12. It is preferred that any disturbance, alteration or other change to data stored in data store 12 be effected in a substantially random manner. In this way, the change will vary from device to device making the change unpredictable and not predictably reversible by an intruder or tamperer.

Power detecting device 23 is coupled with battery pack 20 for sensing whether power is disrupted from battery pack 20. Power detecting device 23 is provided to prevent a tamperer from cutting power to power source unit 30, thereby preventing any of power sources $33_n$ obtaining sufficient charge for proper operation to frustrate access to data stored in data store 12. If power detecting device 23 detects a power disruption associated with battery pack 20, a switch 21 coupling battery pack 20 with power source unit 30 is opened to prevent discharging of power sources $33_n$. Switch 21 is installed in a normally-closed orientation.

The purpose of affecting data stored in data store 12 is to frustrate unwanted access to data store 12. Similar connections may be provided between selected power sources $33_n$ and control unit 22 of battery pack 20 to affect data stored in control unit 22. Such connections are not specifically illustrated in FIG. 1 but are within the understanding of one skilled in the art of circuit design.

Accessories and host devices each may be provided with firmware implementing security protection. The term "firmware" in this context refers to a factory-installed programmable non-volatile memory structure such as, by way of example and not by way of limitation, a programmable gate array or a PROM (Programmable Read-Only Memory). Firmware is sometimes reprogrammable by a manufacturer, thereby providing a useful way for a manufacturer to effect upgrades or updates for devices.

There are two basic ways the present invention may be employed. One way is to use power provided by power sources $33_n$ to disturb, disrupt, corrupt or alter data or programming of firmware, or to destroy or alter a portion of the firmware itself so the firmware's programming is not retrievable or otherwise amenable to reverse engineering. This approach contemplates altering a protected algorithm itself, such as a security algorithm. Using this approach no security key is involved.

Another way in which the present invention may be used is to disrupt, corrupt or alter a security key used with a security algorithm. A security key is involved in an authentication process performed by a security algorithm that limits access to data stored within a data store (e.g., data store 12, or in a data store within control unit 22; not shown in FIG. 1). A security key may be embodied in an embedded code unique to a particular host device or accessory. Embedded codes are sometimes embodied in a programmable configuration to facilitate volume production of a part while permitting providing a unique security key to each individual part.

Power sources $33_n$ are charged up during operation of host device 10 so that a source of power for effecting frustration of unwanted data access may be carried out even though power to host device 10 may be cut off. By way of example and not by way of limitation, security algorithms may be provided for protecting information stored in host device 10 (or in other devices, such as battery pack 20). Security algorithms may be well-known per se. Particular security algorithms may be known. However, the basis for security provided by security algorithms is the key used by the algorithm. If one does not have the key, one cannot use the algorithm to force access to protected information or data except by somehow finding the key, as by rote experimentation. In an era using 64-bit or 128-bit keys, ascertaining a key using such rote experimentation is a matter of luck or sheer computing power.

Power sources $33_n$ provide power for only a limited time after power is terminated. It is intended with the present invention that power may be provided by power sources $33_n$ for a sufficient duration to effect altering of enough data to effectively frustrate unwanted data access. In a preferred embodiment of the invention (see FIG. 2) data alteration is limited to altering data relating to the security key rather than attempting to alter all stored data or attempting to alter an entire security algorithm and its security key.

In a preferred embodiment, power source unit 30 is included within an integrated circuit implementation of host device 10 or an accessory associated with host device 10, such as control unit 22 of battery pack 20. In such a preferred integrated circuit embodiment, power sources $33_n$ are embodied in capacitors embedded within the integrated circuit. Using this preferred integrated circuit implementation, an unwanted user would have difficulty locating power sources $33_n$ and, if located, would likely need to disassemble the integrated circuit to access power sources integrated circuit implementation. Such a disassembling can be recognized as an alert condition so that data may be altered before power sources integrated circuit implementation can be rendered useless in an attempt to avoid data alteration.

It is important to note that disrupting or corrupting or altering data—especially data relating to a security algorithm or its security key—will render an affected device such as host device 10 or its accessory useless to the unwanted user as well as to other users. However, firmware in an affected device may be reprogrammed by a manufacturer to render the affected device usable again, so the affected device is not permanently damaged.

Providing a recording capability (not shown in FIG. 1) permits a manufacturer to read data from the recorder to determine what tampering was attempted to result in data alteration. That is, the present invention may provide a "tamper evident" capability to a host device or associated accessory. The duration of recording capacity may determine how long a duration of a record of activity may be recovered by a manufacturer or other party authorized and equipped for effecting such reading.

The present invention is intended to detect tampering and provide sufficient energy for overwriting, altering or otherwise rendering firmware or software inoperative. One may consider that a device using the present invention effects self-destruction. One may regard the present invention as a type of "suicide pill".

Figure 2:
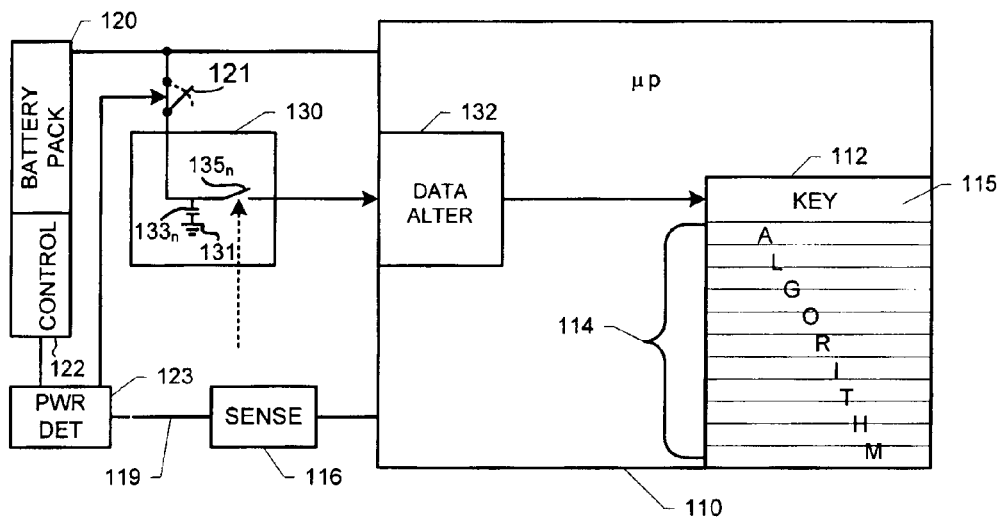
FIG. 2 is a simplified schematic diagram of a second embodiment of the apparatus of the present invention.

FIG. 2 is a simplified schematic diagram of a second embodiment of the apparatus of the present invention. In FIG. 2, a host device 110 includes a data store 112. By way of example and not by way of limitation, host device 110 may be embodied in a microprocessor unit. Data store 112 contains an algorithm stored as a plurality of data bits in a first section 114. The algorithm in this exemplary illustration is a security algorithm that uses a security key for establishing security. The security key is stored separately from first section 114 in a second section 115. Second section 115 may be an included section within data store 112 or, alternatively, may be located at a locus separate from data store 112.

A battery pack 120 is coupled with host device 110 for powering host device 110. Battery pack 120 includes a control unit 122 for effecting cooperation between battery pack 120 and host device 110. Control unit 122 may contain a "gas gauge" program for gauging amount of charge remaining in battery pack 120, or control unit may contain other control algorithms for effecting other safety or operational control functions such as avoiding completely discharging battery pack 120. A sensor unit 116 is coupled with host device 110 for sensing at least one alert condition associates with host device 110. Sensor unit 116 may be configured for sensing a plurality of alert conditions, as described in connection with sensor unit 16 (FIG. 1). A sensing line 119 may be coupled with a power detecting device 123. Other sense lines (not shown in FIG. 2; see sense lines 18, FIG. 1) may also be coupled for sensing alert conditions associated with battery pack 120, control unit 122 or both of battery pack 120 and control unit 122.

A power source unit 130 is coupled with host device 110 and with battery pack 120. In particular power source unit 130 is coupled with a data disrupting or altering unit 132 in host device 110. Data altering unit 132 is coupled with second section 115 of data store 112. Power source unit 130 is configured substantially as power source unit 30 described earlier herein in connection with FIG. 1. In order to avoid prolixity, that description will not be repeated in detail here. Power source unit 130 includes a plurality of power sources $133_n$, preferably embodied in capacitors. Respective power sources $133_n$ are coupled between battery pack 120 and ground locus 131. Respective power sources $133_n$ are coupled with host device 110 via respective switches $135_n$. Only one representative power source $133_n$ and one representative switch $135_n$ are shown in FIG. 2. Sensor unit 116 provides a switching control signal for closing some or all of switches $135_n$ when an alert condition or a particular combination of alert conditions is sensed by sensor unit 116. Closing a respective switch $135_n$ couples a respective power source $133_n$ with host device 110. This permits provision of power to data altering unit 132 sufficient to disturb, alter, change or otherwise affect data stored in second section 115 of data store 112. It is preferred that any disturbance, alteration or other change to data stored in data store 112 be effected in a substantially random manner. In this way, the change will vary from device to device making the change unpredictable and not predictably reversible by an intruder or tamperer.

Power detecting device 123 is coupled with battery pack 120 for sensing whether power is disrupted from battery pack 120. Power detecting device 123 is provided to prevent a tamperer from cutting power to power source unit 130, thereby preventing any of power sources $133_n$ obtaining sufficient charge for proper operation to frustrate access to data stored in data store 112. If power detecting device 123 detects a power disruption associated with battery pack 120, a switch 121 coupling battery pack 120 with power source unit 130 is opened to prevent discharging of power sources $133_n$. Switch 121 is installed in a normally-closed orientation.

Disrupting, corrupting or altering a security key used with a security algorithm affects the authentication process performed by the security algorithm to assure that only authorized users are permitted access to data protected by the security algorithm. Because the period during which power sources $133_n$ may provide power to data altering unit 132 is limited, it makes sense to use that limited power to greatest advantage. One may not be able to assure complete disruption or corruption of the entire algorithm stored in first section 114. There is less data comprising the security key than comprises the algorithm. A given amount of available power for operating data altering unit 132 will permit disrupting or corrupting a greater percentage of the security key than of the entire algorithm. It is, therefore, preferred that data altering unit 132 be applied to second section 115 of data store 112 to effect as much disruption or altering of the security key stored in second section 115 as the available amount of power provided by power sources 133ₙ permits.

Figure 3:
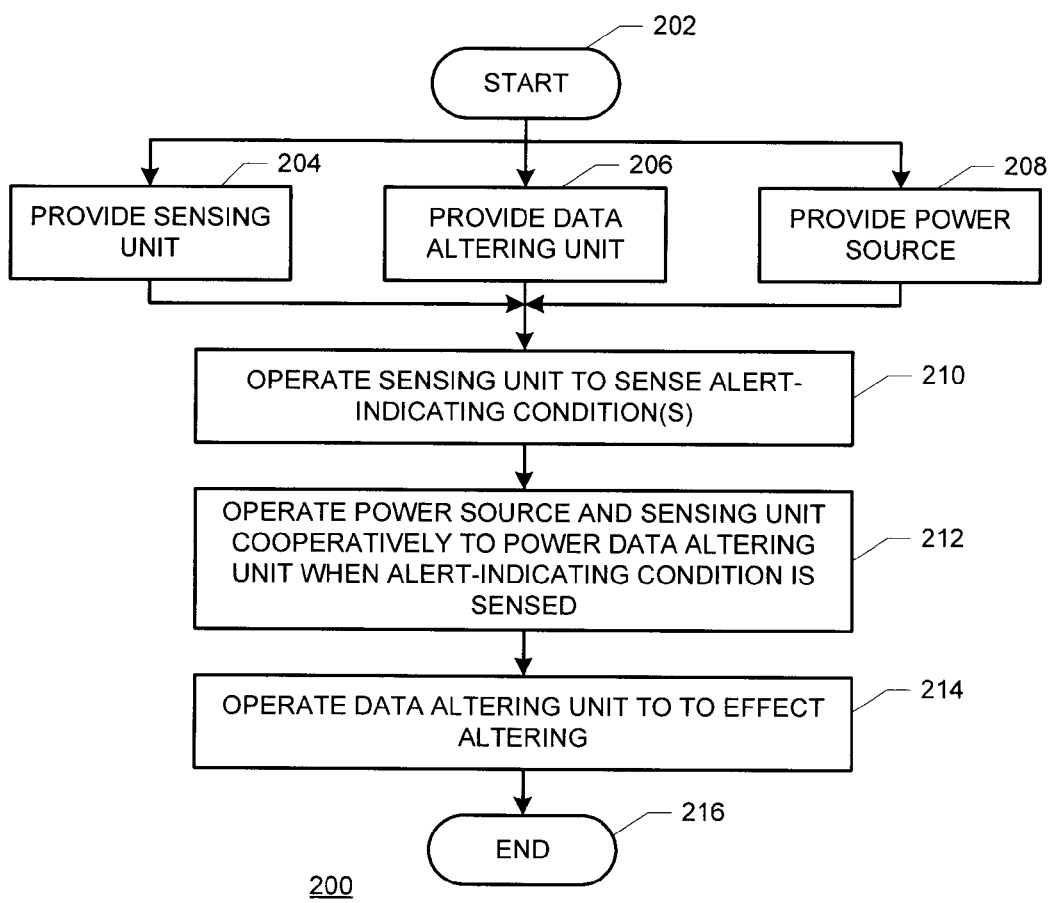
FIG. 3 is a flow chart illustrating the method of the present invention.

FIG. 3 is a flow chart illustrating the method of the present invention. In FIG. 3, a method for altering data stored in a host device when unwanted access to the data is attempted begins at a START locus 202. Method 200 continues with, in no particular order, (1) providing a sensing unit coupled with the host device, as indicated by a block 204; (2) providing a data altering unit coupled with the host device, as indicated by a block 206; and (3) providing a power source coupled with the data altering unit and coupled with the sensing unit, as indicated by a block 208.

Method 200 continues by operating the sensing unit to sense at least one predetermined alert-indicating condition indicating an attempt at achieving the unwanted access, as indicated by a block 210. Method 200 continues by operating the power source and the sensing unit cooperatively to provide power to the data altering unit when the sensing unit senses at least one alert-indicating condition of the at least one predetermined alert-indicating condition, as indicated by a block 212. Method 200 continues by operating the data altering unit to effect the altering so long as at least an operating-level power is provided to the data altering unit, as indicated by a block 214. Method 200 terminates at an END locus 216.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for frustrating unwanted access to data stored with a host device; the apparatus comprising:
   (a) a data disrupting unit coupled with said host device for disrupting said data in response to an action signal;
   (b) at least one power source unit coupled with said host device; and
   (c) a sensor unit coupled with said host device and with said at least one power source unit; said sensor unit being configured and coupled for sensing at least one alert condition associated with said host device; said sensor unit generating an alerting signal when at least one respective alert condition of said at least on alert condition is sensed;
   at least one respective power source unit of said at least one power source unit responding to said alerting signal to present said action signal to said data disrupting unit.

2. An apparatus for frustrating unwanted access to data stored with a host device as recited in claim 1 wherein said data includes a plurality of data bits and wherein said disrupting is effected by changing at least one respective data bit of said plurality of data bits.

3. An apparatus for frustrating unwanted access to data stored with a host device the apparatus comprising:
   (a) a data disrupting unit coupled with said host device for disrupting said data in response to an action signal;
   (b) at least one power source unit coupled with said host device; and
   (c) a sensor unit coupled with said host device and with said at least one power source unit; said sensor unit being configured and coupled for sensing at least one alert condition associated with said host device; said sensor unit generating an alerting signal when at least one respective alert condition of said at least on alert condition is sensed;
   at least one respective power source unit of said at least one power source unit responding to said alerting signal to present said action signal to said data disrupting unit, wherein each respective power source unit of said at least one power source unit is configured for providing power for a power time interval following interruption of application of power to said at least one power source unit.

4. An apparatus for frustrating unwanted access to data stored with a host device as recited in claim 3 wherein said data includes a plurality of data bits and wherein said disrupting is effected by changing selected data bits of said plurality of data bits; said changing being effected for so long as said power time interval lasts.

5. An apparatus for frustrating unwanted access to data stored with a host device as recited in claim 1 wherein said at least one power source unit is at least one capacitor unit; each respective capacitor unit of said at least one capacitor unit being coupled with said host device in a manner effecting charging of each said respective capacitor during operation of said host device.

6. An apparatus for frustrating unwanted access to data stored with a host device as recited in claim 5 wherein said host device includes a portion configured as an integrated circuit and wherein at least one selected capacitor unit of said at least one capacitor unit is installed in an embedded orientation in said integrated circuit.

7. An apparatus for frustrating unwanted access to data stored with a host device as recited in claim 6 wherein each said respective capacitor unit is configured for providing power for a power time interval following interruption of application of power to said at least one capacitor unit.

8. An apparatus for frustrating unwanted access to data stored with a host device as recited in claim 7 wherein said data includes a plurality of data bits and wherein said disrupting is effected by changing selected data bits of said plurality of data bits; said changing being effected for so long as said power time interval lasts.

9. An apparatus for altering data stored in a host device when unwanted access to said data is attempted; the apparatus comprising:
   (a) a sensing unit coupled with said host device for sensing at least one predetermined alert-indicating condition indicating an attempt at achieving said unwanted access;
   (b) a data altering unit coupled with said host device for altering said data; and
   (c) a power source coupled with said data altering unit and coupled with said sensing unit;
   said power source and said sensing unit cooperating to provide power to said data altering unit when said sensing unit senses at least one alert-indicating condition of said at least one predetermined alert-indicating condition; said data altering unit effecting said altering so long as at least an operating-level power is provided to said data altering unit.

10. An apparatus for altering data stored in a host device when unwanted access to said data is attempted as recited in claim 9 wherein said data includes a plurality of data bits and wherein said altering is effected by altering at least one respective data bit of said plurality of data bits.

11. An apparatus for altering data stored in a host device when unwanted access to said data is attempted, the apparatus comprising:
   (a) a sensing unit coupled with said host device for sensing at least one predetermined alert-indicating condition indicating an attempt at achieving said unwanted access;

(b) a data altering unit coupled with said host device for altering said data; and (c) a power source coupled with said data altering unit and coupled with said sensing unit;

said power source and said sensing unit cooperating to provide power to said data altering unit when said sensing unit senses at least one alert-indicating condition of said at least one predetermined alert-indicating condition; said data altering unit effecting said altering so long as at least an operating-level power is provided to said data altering unit, wherein said power source is configured for providing power for a power time interval following interruption of application of power to said power source.

12. An apparatus for altering data stored in a host device when unwanted access to said data is attempted as recited in claim 11 wherein said data includes a plurality of data bits and wherein said altering is effected by altering selected data bits of said plurality of data bits; said altering being effected for so long as said power time interval lasts.

13. An apparatus for altering data stored in a host device when unwanted access to said data is attempted as recited in claim 9 wherein said power source is a coupled with said host device in a manner effecting charging of said capacitor during operation of said host device.

14. An apparatus for altering data stored in a host device when unwanted access to said data is attempted as recited in claim 13 wherein said host device includes a portion configured as an integrated circuit and wherein said capacitor is installed in an embedded orientation in said integrated circuit.

15. An apparatus for altering data stored in a host device when unwanted access to said data is attempted as recited in claim 14 wherein said capacitor is configured for providing power for a power time interval following interruption of application of power to said capacitor.

16. An apparatus for altering data stored in a host device when unwanted access to said data is attempted as recited in claim 15 wherein said data includes a plurality of data bits and wherein said altering is effected by altering selected data bits of said plurality of data bits; said altering being effected for so long as said power time interval lasts.

17. A method for altering data stored in a host device when unwanted access to said data is attempted; the method comprising the steps of:

(a) in no particular order:
  (1) providing a sensing unit coupled with said host device;
  (2) providing a data altering unit coupled with said host device; and
  (3) providing a power source coupled with said data altering unit and coupled with said sensing unit;

(b) operating said sensing unit to sense at least one predetermined alert-indicating condition indicating an attempt at achieving said unwanted access;

(c) operating said power source and said sensing unit cooperatively to provide power to said data altering unit when said sensing unit senses at least one alert-indicating condition of said at least one predetermined alert-indicating condition; and (d) operating said data altering unit to effect said altering so long as at least an operating-level power is provided to said data altering unit.

18. A method for altering data stored in a host device when unwanted access to said data is attempted, the method comprising the steps of:

(a) in no particular order:
  (1) providing a sensing unit coupled with said host device;
  (2) providing a data altering unit coupled with said host device: and
  (3) providing a power source coupled with said data altering unit and coupled with said sensing unit;

(b) operating said sensing unit to sense at least one predetermined alert-indicating condition indicating an attempt at achieving said unwanted access;

(c) operating said power source and said sensing unit cooperatively to provide rower to said data altering unit when said sensing unit senses at least one alert-indicating condition of said at least one predetermined alert-indicating condition; and (d) operating said data altering unit to effect said altering so long as at least an operating-level power is provided to said data altering unit wherein said host device includes a portion configured as an integrated circuit and wherein said power source is a capacitor installed in an embedded orientation in said integrated circuit.

19. A method for altering data stored in a host device when unwanted access to said data is attempted as recited in claim 17 wherein said capacitor is configured for providing power for a power time interval following interruption of application of power to said capacitor.

20. A method for altering data stored in a host device when unwanted access to said data is attempted as recited in claim 18 wherein said data includes a plurality of data bits and wherein said altering is effected by altering selected data bits of said plurality of data bits; said altering being effected for so long as said power time interval lasts.

\* \* \* \* \*